United States Patent [19]

Eklund

[11] 4,085,636
[45] Apr. 25, 1978

[54] METHOD AND MACHINE FOR BAND SAWING

[75] Inventor: Urban Eklund, Soderhamn, Sweden

[73] Assignee: Kockums Automation AB, Vasteras, Sweden

[21] Appl. No.: 709,852

[22] Filed: Jul. 29, 1976

[30] Foreign Application Priority Data

Aug. 5, 1975 Sweden .................................. 7508801

[51] Int. Cl.² .............................................. B27B 13/10
[52] U.S. Cl. ............................................ 83/56; 83/72; 83/74; 83/809; 83/820
[58] Field of Search ..................... 83/74, 72, 56, 820, 83/809, 813, 788

[56] References Cited

U.S. PATENT DOCUMENTS

| | | | |
|---|---|---|---|
| 455,980 | 7/1891 | Ballew | 83/820 |
| 1,499,124 | 6/1924 | Reichmann | 83/820 |
| 2,914,100 | 11/1959 | Lindholm | 83/74 |
| 2,914,102 | 11/1959 | Lindholm | 83/74 |
| 3,318,347 | 5/1967 | Alich | 83/74 |
| 3,327,696 | 6/1967 | Aiken et al. | 83/72 X |
| 3,882,742 | 5/1975 | Fukami | 83/820 X |

*Primary Examiner*—J. M. Meister
*Attorney, Agent, or Firm*—Ross, Ross & Flavin

[57] ABSTRACT

In a band sawing machine having an endless saw blade entrained over two saw pulleys and two hand guides, lateral displacements of the saw blade equilibrium position which occur during a sawing operation are countered by a corrective lateral movement of the saw blade relative to a feed path of the goods to be sawn, by laterally adjusting the position of at least one of the blades guides.

3 Claims, 5 Drawing Figures

METHOD AND MACHINE FOR BAND SAWING

FIELD OF THE INVENTION

The present invention relates to a method for sawing on band sawing machines having endless saw blades extending over two saw pulleys and two blade guides, and to a sawing machine for carrying out said method.

DESCRIPTION OF THE PRIOR ART

The blade guides, which in known band sawing machines have only the passive task of stabilizing the saw blade, generally comprise plates rigidly connected to the stand of the sawing machine. In some types of band saws one or both of the blade guides can be displaceable as to height in order to allow the machine to accommodate different trunk diameters.

It has been found that when sawing, the saw blades of a band saw consistently assume a so-called equilibrium position which is defined by the forces of reaction in the saw blade during sawing, for instance due to a somewhat varying feeding direction of the trunks, etc. The equilibrium position can be displaced to either side of a common tangent, respectively, to the surface of the two blade guides contacting the saw blade, where the saw blade theoretically should be located. Thus, the equilibrium position can be somewhat different due to a certain lateral displacement from the rest position of the band or from the position thereof when being fed around the saw pulleys in an unloaded condition (desired line of cut). It is apparent that this lateral displacement involves an adverse effect on the result of the sawing process, especially the degree of accuracy achieved. Hitherto it has ben tried to neutralize this only in such a way that on the saw goods after sawing the operator has measured the deviation and thereafter by a single adjustment step has displaced the entire machine stand by a corresponding distance relative the feed path of the trunk.

However, said method is unsatisfactory since it is necessary to await the occurance of incorrectly sawn trunks, for instance after half an hour's work, in order to determine the deviation and carry out the displacement of the stand. Hereby a great deal of wood is lost as production waste. Besides, the sawing operation has to be stopped in order to carry out such measurement and adjustment. It has heretofore been proposed in U.S. Pat. No. 2,914,100 to Lindholm to continuously detect the deviation of the saw blade and to correct it by twisting the saw blade about an axis coinciding with the cutting edge thereof. This method or apparatus nonetheless has the disadvantage of a reduced life of the saw blade, especially a fast running one.

SUMMARY OF THE INVENTION

The object of the present invention is to provide a method and a machine which enable the adverse effects of the lateral displacement of the saw blade from the equilibrium position to be eliminated in a more effective way.

The method according to the invention is characterized in that a corrective movement, which implies a relative displacement laterally of the cutting edge of the saw blade defined by the row of teeth, is carried out by at least one of the two blade guides continuously and positively guided during the entire sawing operation, whereby in order to control said positive guiding the lateral displacement of the saw blade is sensed continuously. The said continuous positively guided corrective movement can also be carried out by displacing the whole machine stand laterally relative to the base portion thereof and to feeding path of the goods to be sawn. By the expression "laterally" is meant in this specification and the accompanying claims a direction perpendicular to a line subscribed between the centres of the two saw pulleys and which line is located in the common plane of said pulleys.

Thus, the invention suggests that the band blade guides are made "active," i.e. displaceable in a direction other than the height direction. The machine stand can be displaced laterally relative to the feed path of the goods to be sawn, for instance the trunks, either instead of or simultaneously with the band guides.

The positive guiding is carried out in such a way that be means of a suitable sensor, as for instance an inductive coil or the like, the changes in lateral position of the saw blade, for instance relative to one of the band guides, is sensed continuously during the sawing, and the signals generated hereby are fed to an evaluation unit, for instance a recalculation unit, whereby care is taken as to the parameters of the sensor, and the evaulation unit provides orders to a driving member of arbitrary type (for instance a mechanical, hydraulic, or electromagnetic member), which member displaces the blade guide or guides and/or the machine stand. Of course, the sawn trunk is located in another position between the blade guides, and the lateral displacement in the equilibrium position should actually be measured in said position. However, in practice generally it is sufficient to start out from the fact that the displacements at the two said positions are porportional to each other. For more sophisticated measurements it might be necessary to consider the fact that the bending form of the band due to the lateral forces between the band guides is not linear.

The continuous correction movement of the blade guides can be obtained in two ways, i.e. as a rectilinear lateral displacement or as a rotation movement about an axis parallel to the interconnection line between the centres of the saw pulleys and located outside the cutting edge of the saw blade. Hereby the axis for instance can be located at the centre of the saw blade.

The lateral correction movement of the blade guides i.e. continuous movement of the blade guides and/or the machine stand during the sawing can be regarded as a compensation for the lateral displacement of the saw blade around the deflection the saw blade generally assumes.

In view of the relatively high masses which are displaced by the displacement of the machine stand, said method is feasible only at certain particular occasions, for instance when slower movements prevail etc. For the compensation of fast lateral movements the "active" band guides are preferred.

BRIEF DESCRIPTION OF THE DRAWINGS

The invention will be described further, by way of example, with reference to the accompanying drawings, in which.

DESCRIPTION OF THE PREFERRED EMBODIMENTS

Figure 1:
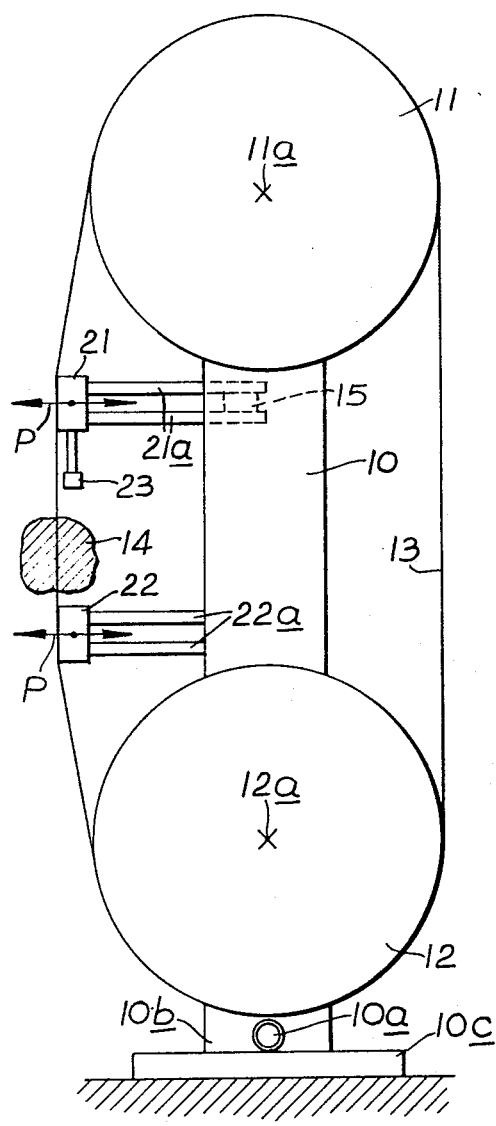
FIG. 1 schematically shows a first embodiment of the device according to the invention.
Figure 4:
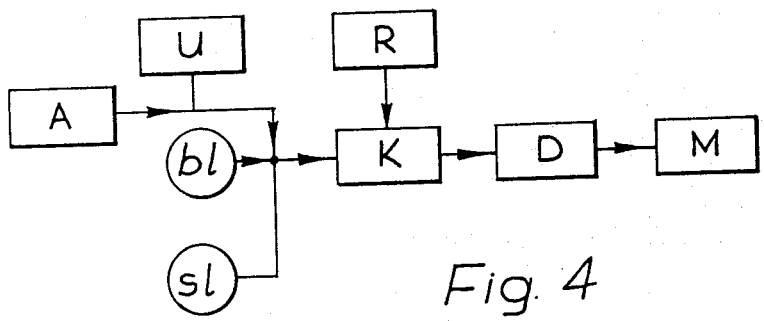
FIG. 4 shows a functional block diagram.

According to FIG. 1, the band sawing machine is provided with a stand 10 supporting an upper saw pulley 11 and a lower saw pulley 12, one of which is driven by a motor, however not shown in the drawing. Hereby, the stand 10 is displaceably arranged on a base portion 10c anchored in the floor, and the displacement is obtained by means by any known device 10b for positively controlled sliding displacement, for instance a dove tail guide in combination with a rack and a gear 10a. The gear 10a or a corresponding other guide member is driven by a not disclosed auxiliary motor working in accordance with signals and orders, respectively, obtained from a recalculation unit D (FIG. 4).

An endless saw blade 13 is tensioned around the two saw pulleys 11, 12, and adjacent to the two saw pulleys blade guides 21 and 22 are arranged, over which the saw band runs and by means of which it is guided actively, since according to the invention the two blade guides 21, 22 are arranged for lateral displacement, i.e. in the direction of the arrows P which are perpendicular to the interconnection line B (FIG. 2) between the centres 11a, 12a of the saw pulleys. For instance, the displacement of the blade guides is so obtained that their support rods 21a, 22a are slidably arranged in the stand 10 and there are affected by a driving member 15 which is controlled by orders from the recalculation unit D (FIG. 4) in the same manner as the driving member that drives the gear 10a.

One or both of the blade guides can be settably arranged and furtheron, as already previously mentioned, the continuous setting of one or both blade guides during sawing either can be replaced by or combined with the continuous setting of the stand during sawing relative the feeding path of the sawn trunk 14 that extends perpendicularly to the plane of the drawing in FIG. 1. The trunk 14 is supported by any transport device known per se in connection with band sawing machines.

The input values for the continuous lateral displacement of one or both blade guides and/or the stand are obtained from a sensor or gauge A (FIG. 4), which in the embodiment shown consists of one or several inductive coils 23 that measure the lateral position changes of the saw blade 13 relative the blade guide 21.

Figure 2:
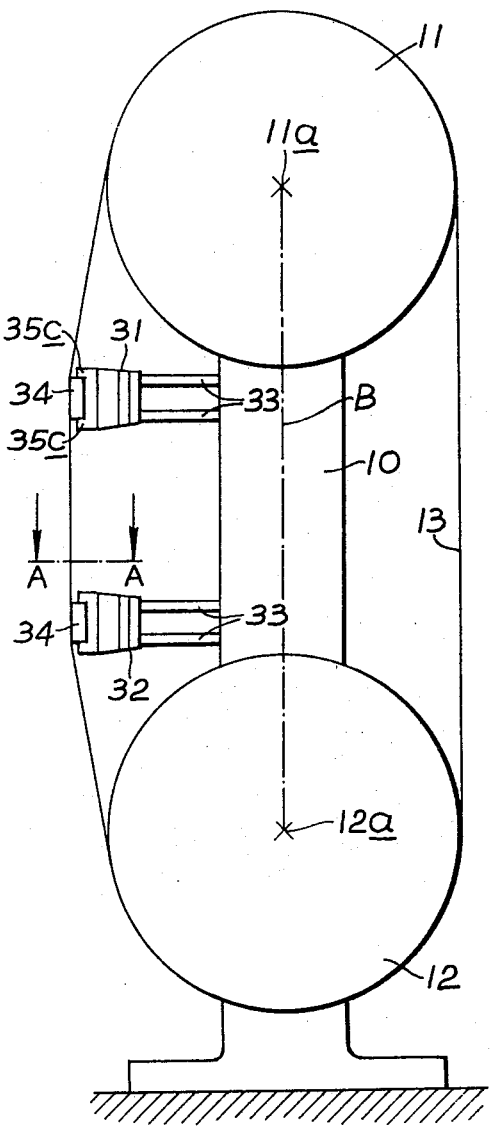
FIG. 2 similarly shows a second embodiment.
Figure 3A:
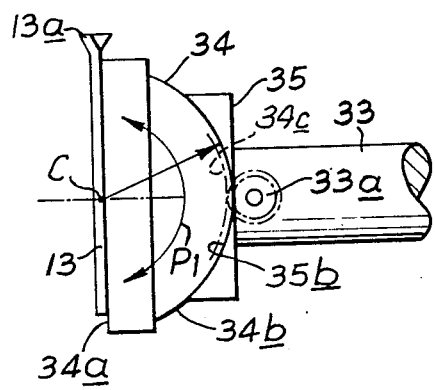
FIG. 3a is a partial plan view to an enlarged scale in the direction of the arrows A in FIG. 2.

In the alternative embodiment according to FIGS. 2 and 3a, each one of the blade guides 31, 32 is provided with a head 34 which at the front side thereof is defined by a planar surface 34l over which the saw blade 13 runs, and the rear side thereof is defined by a cylindrical surface 34b, the curvature centre C of which preferably, but not necessarily, is located in the saw blade plane, i.e. in practice at the planar front surface 34a. The head 34 abuts slidingly against a support bearing 35 having a corresponding cylindrical surface. The two elements, i.e. the head 34 and the bearing 35, are adjustably attached to each other, for instance in such a way that the support bearing 35 is provided with upper and lower abutments 35c (FIG. 3a) which stabilize the position of the heads 34 relative the bearing in the height direction. The saw blade 13 presses itself the heads 34 against the bearings 35 and therefore laterally stabilizes the positions thereof. Within brackets 33 gears 33a for instance are arranged which firstly mesh with a row of teeth 34c, for instance arranged countersunk in the cylindrical surface 34b, and secondly are driven by a not disclosed driving member controlled by orders either from the recalculation unit D (FIG. 4) or exactly as in the previous embodiment with laterally displaceable blade guides. In this case the stand 10 is anchored in the floor. FIG. 3 a discloses that the rotation of the band guide head 34 in the direction of the double arrow P, implies that the saw blade 13 having the row of teeth 13a is laterally shifted in the direction of the double arrow $P_2$. It should be noted that each one of the movements always falls within the magnitude range of some millimeters, but on both sides of the "zero line."

The brackets 33 of the blade guides are of course in this case always stationary during operation, but preferably they can be made adjustable for adaption to different saw blades, etc. in a way known per se.

Figure 3B:
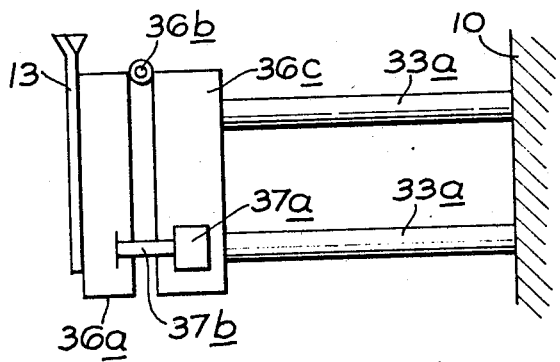
FIG. 3b is a plan view similar to FIG. 3a, but relating to an embodiment where the axis of rotation is not located in the plane of the saw blade.

According to FIG. 3b, the blade guide has a front portion 36a which by means of a hinge device or similar 36b is connected pivotely to the body 36c of the blade guide which per se preferably by means of support rods 33a is rectilinearly movable laterally relative the machine stand 10 for the above stated adjustment purposes. Within or at the body 36c there is a driving member, for instance a motor 37a arranged, which rotates a screw 37b that at the opposite end meshes with a not shown nut rotatably but fixed as to position arranged in the front portion 35a. The result obtained is a rotation laterally of the front portion 36a and thereby also a rotation of the saw blade 13 around the axis represented by the hinge 36b.

In FIG. 4 the functional block diagram for the continuous positive guiding of the saw blade and the row of teeth thereon, respectively, relative the centre line of the saw goods is shown in order to achieve compensation for the movements of the saw blade from the equilibrium position. The sensor A (See for instance 23 in FIG. 2) measures the position of the saw blade laterally relative the band guide 21 (FIG. 2). A compensator U settable by the operator corrects the output signal from the sensor relative machine constants, etc. (compensation for geometry). This corrected value is supplied together with information b1 on the position of the blade guide relative the stand 10 (FIG. 2) and information s1 on the position of the stand 10 relative the centre line of the goods 14 to be sawed, and said values are supplies as the actual values to a comparator K, which additionally from a control unit R is supplied with the desired position of the saw blade and the row of teeth thereon, respectively, relative the centre line of the goods to be sawed as a set value. The output value from the comparator K is first supplied to a recalculator D where the difference between the actual value and the set value is recalculated to a control signal which is supplied to the driving member M and the members thereof which provide the displacement and relative displacement, respectively, of the saw blade and for instance the gear 10a or driving member 15 according to FIG. 1, or the gear 33a according to FIG. 3 and the motor 37a respectively, according to FIG. 3b, etc.

It is apparent that apart from the embodiments described several other specific embodiments of the invention are possible. The lateral displacement as well as the rotation of the blade guides can be solved by several prior art methods, as well mechanical, hydraulic, electrical, etc. methods. The same is true as to the lateral displacement of the stand and the bearing thereof at the base portion. In excess to other known electrical gauges, other types of sensors for the position of the saw blade can be used, for instance optical or mechanical sensors.

I claim:

1. In a method of continuously preserving the correct line of cut on a band sawing machine including an endless saw blade having a cutting edge and being entrained over two saw pulleys and a pair of blade guides and a means for sensing the lateral position of the saw blade, the steps of: continuously sensing for an lateral displacement of the saw blade during sawing from the correct line of cut and countering the adverse effect of such a lateral displacement by generating a corrective movement involving a lateral displacement in the opposite sense of the cutting edge of the saw blade through a lateral movement of at least one blade guide in the said opposite sense relative to the correct line of cut, the corrective movement of the blade guide being carried out as a rectilinear lateral displacement.

2. The method according to claim 1, wherein the lateral corrective movement is carried out by laterally displacing the machine stand relative to a base portion thereof.

3. A band sawing machine comprising: a stand, tow saw pulleys arranged on the stand, a base portion supporting the stand, two blade guides, an endless saw blade provided with a cutting edge and entrained over the pulleys and the blade guides, means for sensing the lateral position of the saw blade, and a driving member adapted to generate a corrective movement, at least one of the blade guides being adapted to impart a lateral corrective movement to the saw blade resulting in a lateral displacement of at least the cutting edge of the saw blade, the stand being adapted to perform the corrective movement by lateral displacement thereof relative to the base portion.

* * * * *